US010693401B2

(12) United States Patent
Gibeau et al.

(10) Patent No.: US 10,693,401 B2
(45) Date of Patent: Jun. 23, 2020

(54) ELECTRIFIED VEHICLE OFF-BOARD LOAD POWER MANAGEMENT

(71) Applicant: Ford Global Technologies, LLC, Dearborn, MI (US)

(72) Inventors: John Paul Gibeau, Canton, MI (US); Christopher W. Bell, Livonia, MI (US)

(73) Assignee: Ford Global Technoiogies, LLC, Dearborn, MI (US)

( * ) Notice: Subject to any disclaimer, the term of this patent is extended or adjusted under 35 U.S.C. 154(b) by 260 days.

(21) Appl. No.: 15/601,412

(22) Filed: May 22, 2017

(65) Prior Publication Data

US 2018/0334036 A1    Nov. 22, 2018

(51) Int. Cl.

| H02P 9/00 | (2006.01) |
| B60L 1/00 | (2006.01) |
| B60L 50/16 | (2019.01) |
| B60L 15/20 | (2006.01) |
| B60L 50/10 | (2019.01) |
| H02P 9/48 | (2006.01) |
| B60L 50/61 | (2019.01) |
| B60K 6/445 | (2007.10) |
| B60W 50/08 | (2020.01) |
| B60W 10/30 | (2006.01) |
| B60W 20/00 | (2016.01) |

(52) U.S. Cl.
CPC ............. *H02P 9/00* (2013.01); *B60K 6/445* (2013.01); *B60L 1/00* (2013.01); *B60L 15/20* (2013.01); *B60L 15/2045* (2013.01); *B60L 50/10* (2019.02); *B60L 50/16* (2019.02); *B60L 50/61* (2019.02); *B60W 50/085* (2013.01); *H02P 9/48* (2013.01); *B60L 2210/40* (2013.01); *B60L 2250/16* (2013.01); *B60W 10/30* (2013.01); *B60W 20/00* (2013.01); *B60Y 2200/91* (2013.01); *B60Y 2200/92* (2013.01); *B60Y 2300/60* (2013.01); *B60Y 2400/602* (2013.01); *B60Y 2400/61* (2013.01); *Y10S 903/906* (2013.01)

(58) Field of Classification Search
CPC ............. H02P 9/00; B60L 50/60; B50L 50/00
USPC ......................................................... 307/9.1
See application file for complete search history.

(56) References Cited

U.S. PATENT DOCUMENTS

| 6,687,581 B2* | 2/2004 | Deguchi ................ B60K 6/442 701/22 |
| 7,904,217 B2* | 3/2011 | Miller .................... B60K 6/485 701/22 |
| 8,755,963 B2 | 6/2014 | Yamamoto et al. |
| 8,903,580 B2 | 12/2014 | Tolkacz |
| 9,511,676 B2* | 12/2016 | Loftus .................... B60L 55/00 |

(Continued)

*Primary Examiner* — Adi Amrany
(74) *Attorney, Agent, or Firm* — David Kelley; Brook Kushman P.C.

(57) ABSTRACT

An off-board load power management system for an electrified vehicle is provided. The system may include a DC-to-AC inverter for providing power to auxiliary loads. Using a manual selector, an operator may select an amount of power to be allocated for inverter use at all time during vehicle operation. A controller may guarantee the selected amount of power is available for inverter use and control a generator accordingly. The controller may manage the distribution of power from a battery and/or generator to the powertrain and other vehicle accessories to ensure the selected amount for the inverter always remains available.

20 Claims, 3 Drawing Sheets

(56) References Cited

U.S. PATENT DOCUMENTS

| | | | |
|---|---|---|---|
| 10,075,012 B2* | 9/2018 | Ceravalo | H02J 7/1461 |
| 2009/0259363 A1* | 10/2009 | Li | B60K 6/445 |
| | | | 701/36 |
| 2010/0044129 A1* | 2/2010 | Kyle | B60K 6/26 |
| | | | 180/65.25 |
| 2012/0010767 A1* | 1/2012 | Phillips | G01C 21/3469 |
| | | | 701/22 |
| 2012/0010768 A1* | 1/2012 | Phillips | B60L 15/2045 |
| | | | 701/22 |
| 2015/0112522 A1* | 4/2015 | Liang | B60W 10/06 |
| | | | 701/22 |
| 2016/0200212 A1 | 7/2016 | Six | |
| 2017/0063146 A1* | 3/2017 | Ceravalo | B60R 16/03 |
| 2018/0194232 A1* | 7/2018 | Frank | B60L 58/12 |

* cited by examiner

ELECTRIFIED VEHICLE OFF-BOARD LOAD POWER MANAGEMENT

TECHNICAL FIELD

The present disclosure relates off-board load power management in an electrified vehicle, such as a hybrid electric vehicle or an all-electric vehicle.

BACKGROUND

Electrified vehicles today can produce large amounts of power for on-board and off-board use. On-board loads may include traction motors, vehicle accessories, and other loads associated with vehicle operation. Off-board loads, referred to as auxiliary loads, are not associated with operation of the electrified vehicle. They may receive their power through a direct current (DC)-to-alternating current (AC) inverter. These auxiliary loads may include such things requiring power as appliances, computer equipment, mobile homes, or military-based weapons systems. The power available to off-board or auxiliary loads may fluctuate based on the power requirements of the electrified vehicle, particularly the powertrain. This may result is possible damage to the powered device or, at a minimum, operator dissatisfaction.

SUMMARY

An embodiment of the present disclosure is directed to a system for an electrified vehicle. The system may include an inverter, a battery that receives energy from a generator and provides power to the inverter, and a manual selector that receives input indicative of a minimum amount of power to allocate to the inverter. The system may further include a controller that controls output of the generator based on the input and allocates at least the minimum amount of power to the inverter.

The manual selector may provide for the selection of a percentage of power as the minimum amount of power. Alternatively, an actual power value may be selected as the minimum amount of power using the manual selector. The minimum amount may be reset to zero in response to a change in key-switch status or the minimum amount may be maintained between changes in key-switch status.

The system may further include a motor that receives power from the battery and provides torque to drive wheels. The controller may be configured to limit the power the motor receives from the battery or a generator to ensure the minimum amount of power is allocated to the inverter. The system may also include an interface, in communication with the controller, having an indicator that displays an alert when the minimum amount of power allocated for inverter use impacts power available to propel the vehicle and power accessories. The interface may have an indicator that displays the minimum amount of power selected by the operator. Moreover, the manual selector may be integrated into the interface.

Another embodiment of the present disclosure is directed to a vehicle. The vehicle may include an inverter, a manual selector, and a generator. The inverter may convert DC energy from a high-voltage bus to AC energy for off-board use during vehicle operation. The manual selector may receive input indicative of a minimum amount of power to allocate to the inverter. The generator may provide energy to the high-voltage bus based in part on the minimum amount.

The manual selector may provide for the selection of a percentage of power as the minimum amount of power. Alternatively, the manual selector may provide for the selection of an actual power value as the minimum amount.

The vehicle may further include a controller, in communication with the manual selector, that controls the generator and allocates at least the selected amount of power to the inverter based on the input. The vehicle may also include a motor that receives power from the battery and provides torque to drive wheels. The controller may be configured to limit the power the motor receives from the battery to ensure the minimum amount of power is allocated to the inverter. An interface, in communication with the controller, may have an indicator that displays an alert when the minimum amount of power allocated for inverter use impacts power available to propel the vehicle and power accessories.

An additional embodiment of the present disclosure is directed to a method comprising: receiving, through an interface, operator input indicative of a minimum amount of power to allocate to an inverter; controlling output of a generator in an electrified vehicle based on the minimum amount; and allocating at least the minimum amount to the inverter during operation of the vehicle.

The method may further include resetting the minimum amount of power to zero in response to a change in key-switch status or displaying the minimum amount of power selected by the operator. Additionally, the method may include storing energy produced by the generator in a battery and limiting power provided to an electric motor from the battery to propel the vehicle to ensure the minimum amount of power is allocated to the inverter. An alert may be displayed when the minimum amount of power allocated for inverter use impacts power available to propel the vehicle and power accessories.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
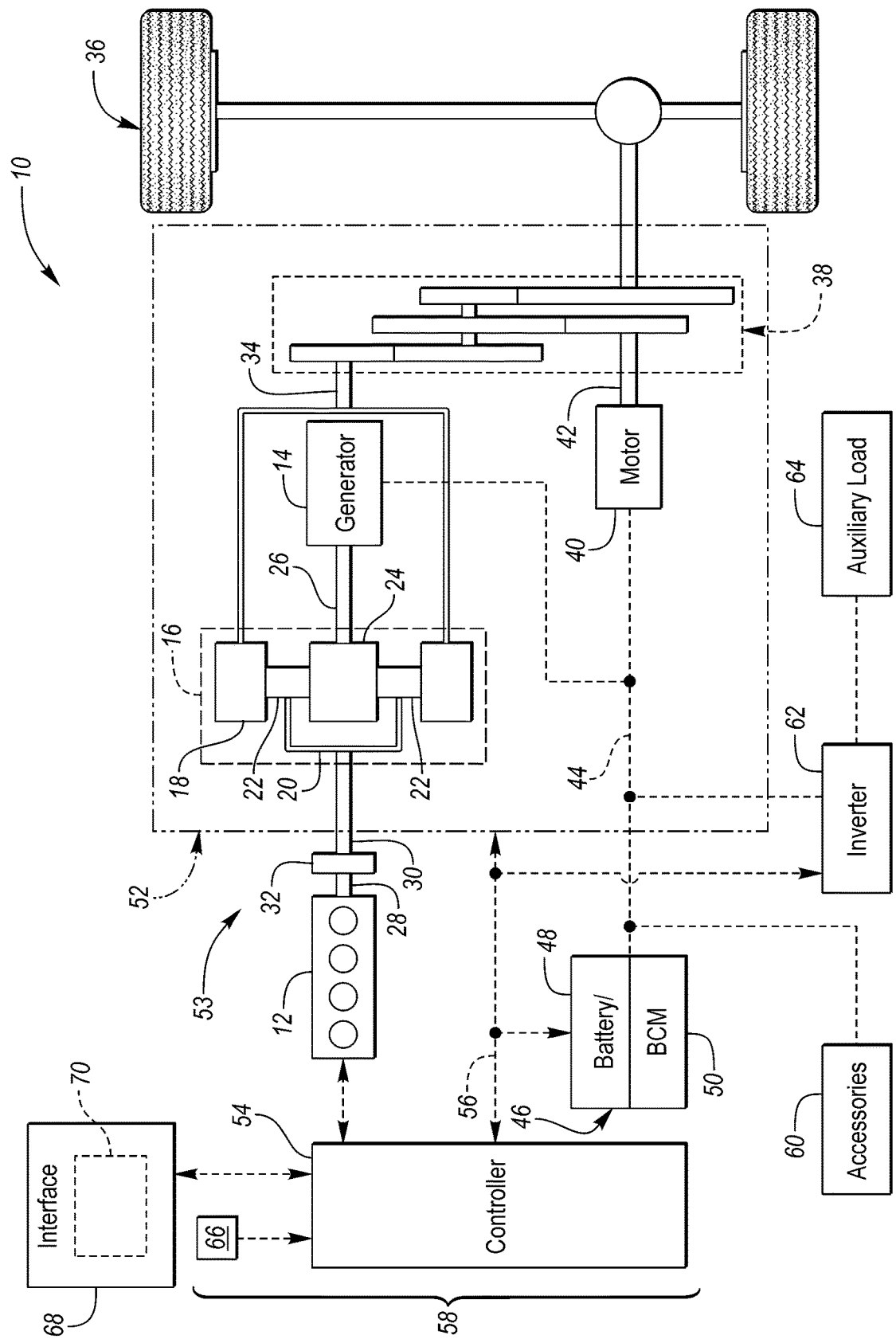
FIG. 1 is a simplified, schematic representation of a hybrid electric vehicle (HEV) including an inverter, according to an embodiment of the present disclosure.

Referring now to the drawings, FIG. 1 is a simplified schematic representation of a vehicle 10, which may include an engine 12 and an electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 may include a ring gear 18, a carrier 20, planet gears 22, and a sun gear 24.

The generator 14 can also output torque to a shaft 26 connected to the sun gear 24. Similarly, the engine 12 may output torque to a crankshaft 28, which may be connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which may be connected to a first set of vehicle drive wheels, or primary drive wheels 36, through a gear set 38.

The vehicle 10 may include a second electric machine, or motor 40, which can be used to output torque to the drive wheels 36 via a shaft 42 connected to the gear set 38. Other vehicles within the scope of the present disclosure may have different electric machine arrangements, such as more or fewer than two electric machines. In the embodiment shown in FIG. 1, the electric machine arrangement (i.e., the motor 40 and the generator 14) can both be used as motors to output torque. Alternatively, each can also be used as a generator, outputting electrical power to a high voltage bus 44 and to an energy storage system 46, which may include a battery 48 and a battery control module (BCM) 50.

The battery 48 may be a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10. The terms "power" and "energy" may be used interchangeably herein. As understood by one of ordinary skill in the art, energy is the capacity to do work, while power is the rate at which work is done (or energy is transmitted). Thus, energy is merely power integrated over time.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40), a vehicle control system, shown generally as controller 54, may be provided. Although it is shown as a single controller, it may include multiple controllers which may be used to control multiple vehicle systems. For example, the controller 54 may be a vehicle system controller/powertrain control module (VSC/PCM). In this regard, the PCM portion of the VSC/PCM may be software embedded within the VSC/PCM, or it can be a separate hardware device.

A controller area network (CAN) 56 allows the controller 54 to communicate with the transmission 52 and the BCM 50. Just as the battery 48 includes a BCM 50, other devices controlled by the controller 54 may have their own controllers. For example, an engine control unit (ECU) (not shown) may communicate with the controller 54 and may perform control functions on the engine 12. In addition, the transmission 52 may include a transmission control module (TCM) (not shown), configured to coordinate control of specific components within the transmission 52, such as the generator 14 and/or the motor 40. Some or all of these various controllers and associated components can make up a control system 58 in accordance with the present disclosure. Although illustrated and described in the context of the vehicle 10, which is a full HEV, it is understood that embodiments of the present disclosure may be implemented on other types of electrified vehicles, such as those including other hybrid systems or all-electric vehicles.

In addition to the motor 40 and the generator 14, the battery 48 may provide power to on-board loads associated with vehicle operation. For instance, the battery 48 may be used to power the vehicle's various other accessories, headlights, and the like (collectively referred to herein as accessories 60). It may do so directly or indirectly. As one example, the vehicle 10 may include a separate, secondary battery (not shown), such as a typical 12-volt battery, that provides the power to the accessories 60, while the battery 48 is used to charge the secondary battery via a DC-to-DC converter (not shown).

The vehicle may also include a DC-to-AC inverter 62 connected to the battery 48 through the high voltage bus 44. The inverter 62 may also receive power from the battery 48 and/or the generator 14 and provide power to "off-board" or auxiliary loads 64 not associated with the operation of the vehicle 10. The inverter 62 may convert DC energy received from the high voltage bus 44 to AC energy for off-board vehicle use during operation. Electrified vehicles today can produce a lot of power. Some auxiliary loads may require large amounts of power, such as weapons systems and radar units being towed by the vehicle 10 in military applications. As another example of an auxiliary load, the inverter may be used to power a mobile home towed by the vehicle. Other auxiliary loads 64 powered by the inverter 62 may include refrigerators, small appliances, or the like.

The inverter 62 may contend with the dynamic traction power requirements typical when the vehicle 10 is being driven. The motor 40 may require power to propel the vehicle based on operator demand, while the inverter 62 may require a certain amount of power to support the auxiliary loads 64. According to an embodiment, the vehicle 10 may allocate a minimum amount of power to the inverter 62 to avoid starving the inverter of power during peak traction power demand events. As used herein, the term "allocate" may refer to providing power to the inverter 62 or reserving power to be provided to the inverter when required. The vehicle 10 may include a manual selector 66 that permits an operator of the vehicle to allocate a specific amount of power developed by the vehicle's electrical system to the inverter 62 for off-board use of auxiliary loads 64. The specific amount would be a minimum amount of power that would be available from the high voltage bus 44 for inverter use at all times during the initiating drive event.

The manual selector 66 may be a hardware-based input device, a software-based input device, or a combination hardware- and software-based input device. For instance, the manual selector 66 may be a physical dial, a momentary rocker switch, a virtual dial, one or more physical or virtual pushbuttons, or the like. The manual selector 66 may be integrated into an interface 68, such as a human-machine interface having a display 70.

Figure 2A:
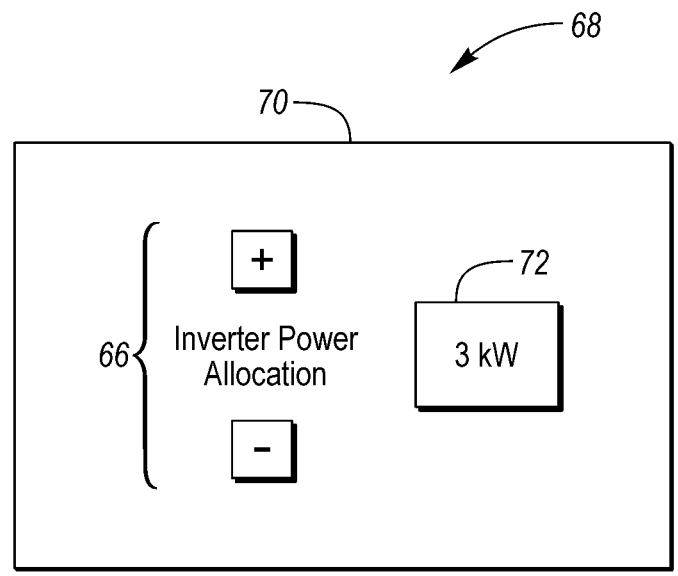
FIG. 2a is an example of an interface having a display including a manual selector and an indicator, according to an embodiment of the present disclosure.

The interface 68 may be disposed within a dashboard (not shown) of the vehicle 10, such as an instrument panel or center console area. The display 70 may be a liquid crystal display (LCD), a plasma display, an organic light emitting display (OLED), or any other suitable display. The display 70 may include a touch screen for receiving driver input associated with selected areas of the display. The interface 68 may also include one or more buttons (not shown), including hard keys or soft keys, located adjacent the display 70 for effectuating driver input. Accordingly, the driver or other operator may make the inverter power allocation using the manual selector 66 via the interface 68, as shown, for example, in FIG. 2a. The display 70 may further include an indicator 72 that displays the selected minimum amount of power. An operator may make the allocation of a minimum amount of power for inverter use because the operator presumably knows how much power is needed by the auxiliary loads 64.

The controller 54 may receive input indicative of the minimum amount of power to allocate to the inverter 62. The controller 54 may use the input for powertrain control purposes. The minimum amount selected by the operator may be used, at least in part, by the controller 54 to control the generator output. For instance, the higher the selected minimum amount of power for inverter use, the more the controller 54 may operate the generator 14 to produce power for charging the battery 48 and/or supplying directly to the inverter 62 via the high voltage bus 44. The controller 54 may ensure that the power required of the inverter 62 is always satisfied.

According to one embodiment, the manual selector 66 may provide selection of a percentage of available system power as the minimum amount of power to be allocated for inverter use. For example, the operator may have the option to select 25% of full power, 50% of full power, or the like, via the manual selector 66. According to another embodiment, the manual selector 66 may provide selection of an actual power value as the minimum amount to be allocated for inverter use. For example, the operator may have the option to select 1.5 kW, 3 kW, 7 kW, or the like, via the manual selector 66.

The minimum amount of power allocated to the inverter 62 may be changed by the operator at any time. Moreover, according to some embodiments, the allocation of the minimum amount of power for inverter use may apply only to the key cycle during which the selection is made. Accordingly, the minimum amount of power allocated for inverter use may be reset in response to a change in key-switch status. Alternatively, the minimum amount of power allocated for inverter use may be maintained between changes in key-switch status. The operator may be able to select whether to reset or maintain the selected power allocation between key-switch cycles.

Figure 2B:
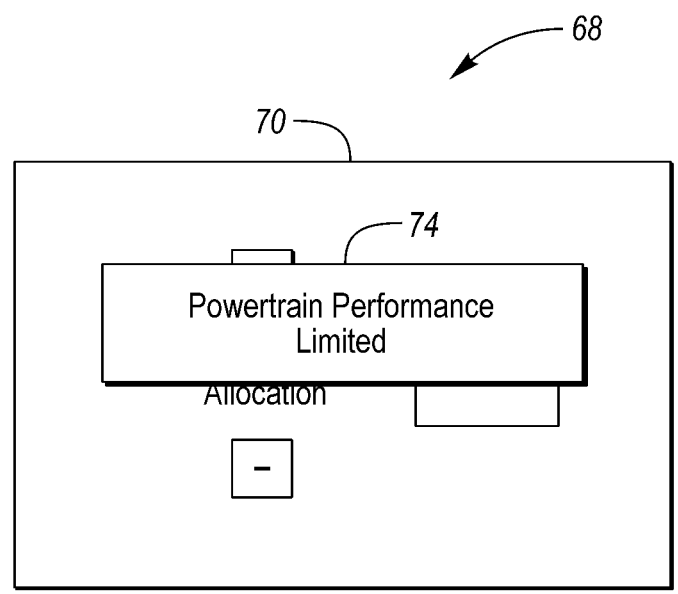
FIG. 2b is another example of the interface and display including an alternate indicator.

In certain circumstances, the allocation of a minimum amount of power for inverter use may impact the available power required for the motor 40 to produce torque to propel the vehicle 10. For instance, when the inverter power allocation is relatively high, the available powertrain tractive energy may be insufficient to meet relatively high motor torque demand. In these instances, the controller 54 may limit the power the motor 40 receives from the battery 48 to ensure the minimum amount of power is always allocated to the inverter 62. As shown in FIG. 2b, the interface 68 may include an indicator 74 that displays an alert when the minimum amount of power allocated for inverter use impacts power available to propel the vehicle and power accessories. Thus, the interface 68 may convey to the driver that powertrain performance may be limited due to the current inverter power allocation.

Figure 3:
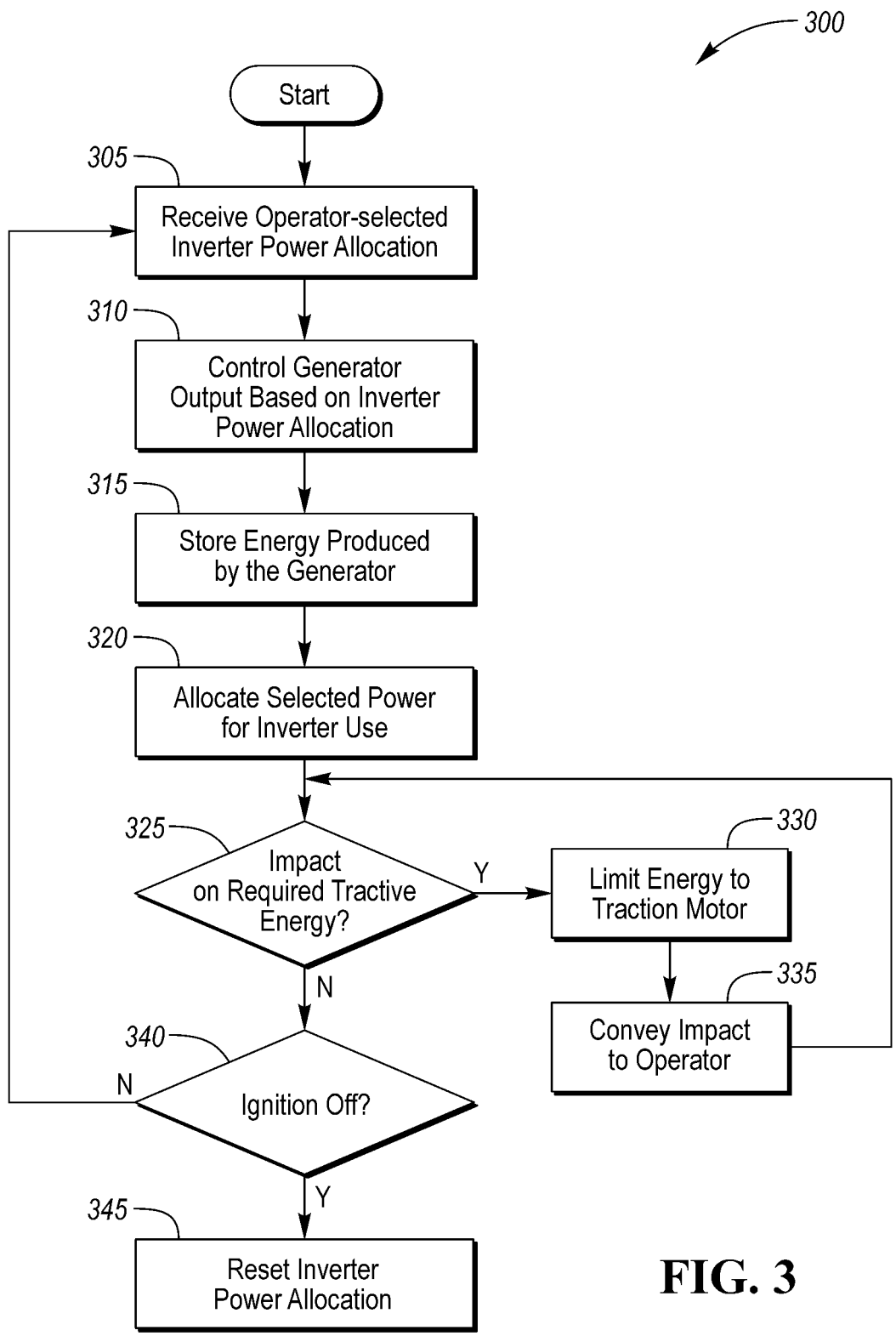
FIG. 3 is a flow diagram depicting a method for allocating power to an inverter, according to an embodiment of the present disclosure.

FIG. 3 is a flow diagram of a method 300 for allocating a minimum amount of power to the inverter 62 for off-board used by auxiliary loads 64, in accordance with an embodiment of the present disclosure. At step 305, the controller 54 may receive operator input indicative of a minimum amount of power to allocate to the inverter 62. The input may be received through the interface 68, such as via the manual selector 66. The interface 68 may display the indicator 72 displaying the selected minimum amount of power. At step 310, the controller 54 may control the output of the generator 14 based on the minimum amount selected by the operator. The energy produced by the generator 14 may be stored in the battery 48, as provided at step 315, or it may be supplied directly to the inverter. Further, the controller 54 may allocate, either from the battery 48 or the generator 14, or both, at least the minimum amount of power to the inverter 62 for use during operation of the vehicle 10, as provided at step 320.

At step 325, the controller 54 may determine whether minimum amount of power allocated to the inverter 62 impacts the required tractive energy (i.e., the energy required by the motor 40 to propel the vehicle 10). If the inverter power allocation impacts the required tractive energy, the controller 54 may limit the power provided to the electric motor 40 from the battery 48 to ensure the minimum amount of power selected by the operator is allocated to the inverter 62, as provided at step 330. At step 335, the interface 68 may display an alert indicator 74 conveying the impact on powertrain performance when the minimum amount of power allocated for inverter use impacts available energy required for the motor 40. The method may then return to step 325.

If, at step 325, it is determined that the inverter power allocation does not presently impact the required tractive energy, the method may proceed to step 340. At step 340, the controller 54 may determine whether the vehicle 10 has been powered off. If so, the controller 54 may reset the minimum amount of power allocated to the inverter 62 to zero, as provided at step 345. In this manner, there may no carryover of the inverter power allocation from one key cycle to the next. Rather, the operator may be required to select a minimum amount of power to be allocated for inverter use, if desired, each key cycle. If the vehicle 10 has not been powered off, the method may return to step 305 and restart.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for an electrified vehicle comprising:
an inverter;
a battery that receives energy from a generator and provides power to the inverter;
a manual power selector that receives an operator input of a minimum numerical amount of power to allocate to the inverter for off-board loads not associated with propulsion of the vehicle; and
a controller configured to control output of the generator based on the operator input and allocates at least the minimum numerical amount of power to the inverter.

2. The system of claim 1, wherein the manual power selector provides selection of a percentage of power as the minimum numerical amount.

3. The system of claim 1, wherein the manual power selector provides selection of an actual power value as the minimum numerical amount.

4. The system of claim 1, wherein the minimum numerical amount is reset to zero in response to a change in key-switch status.

5. The system of claim 1, wherein the minimum numerical amount of power selected is maintained between changes in key-switch status.

6. The system of claim 1, further comprising a motor that receives power from the battery and provides torque to drive wheels, wherein the controller is configured to limit the power the motor receives from the battery to ensure the minimum numerical amount of power is allocated to the inverter for the off-board loads.

7. The system of claim 6, further comprising an interface, in communication with the controller, having an indicator that displays an alert when the minimum numerical amount of power allocated for inverter use impacts power available to propel the vehicle and power accessories.

8. The system of claim 1, further comprising an interface, in communication with the controller, having an indicator that displays the minimum numerical amount of power selected by the operator.

9. The system of claim 8, wherein the manual power selector is integrated into the interface.

10. A vehicle comprising:
    an inverter that converts DC energy from a high-voltage bus to AC energy for off-board loads not associated with vehicle operation;
    a manual power selector that receives an operator input indicative of a minimum numerical amount of power to allocate to the inverter for the off-board loads; and
    a generator that provides energy to the high-voltage bus based in part on the numerical amount.

11. The vehicle of claim 10, wherein the manual power selector provides selection of a percentage of power as the minimum numerical amount.

12. The vehicle of claim 10, wherein the manual power selector provides selection of an actual power value as the minimum numerical amount.

13. The vehicle of claim 10, further comprising a controller, in communication with the manual power selector, that controls the generator and allocates at least the minimum numerical amount of power to the inverter based on the input.

14. The vehicle of claim 13, further comprising a motor that receives power from the battery and provides torque to drive wheels, wherein the controller is configured to limit the power the motor receives from the battery to ensure the minimum numerical amount of power is allocated to the inverter.

15. The vehicle of claim 14, further comprising an interface, in communication with the controller, having an indicator that displays an alert when the minimum numerical amount of power allocated for inverter use impacts power available to propel the vehicle and power accessories.

16. A method comprising:
    receiving, through an interface, an operator input indicative of a minimum numerical amount of power to allocate to an inverter for off-board loads not associated with propulsion of the vehicle;
    controlling output of a generator in an electrified vehicle based on the minimum numerical amount; and
    allocating at least the minimum numerical amount to the inverter during operation of the vehicle.

17. The method of claim 16, further comprising: resetting the minimum numerical amount to zero in response to a change in key-switch status.

18. The method of claim 16, further comprising: displaying the minimum numerical amount of power selected by the operator.

19. The method of claim 16, further comprising:
    storing energy produced by the generator in a battery; and
    limiting power provided to an electric motor from the battery to propel the vehicle to ensure the minimum numerical amount of power is allocated to the inverter.

20. The method of claim 19, further comprising: displaying an alert when the minimum numerical amount of power allocated for inverter use impacts power available to propel the vehicle and power accessories.

* * * * *